United States Patent
McElvain

(10) Patent No.: US 7,324,696 B2
(45) Date of Patent: Jan. 29, 2008

(54) METHOD FOR TAG PLANE GROWTH AND CONTRACTION USING RUN LENGTH ENCODED DATA

(75) Inventor: Jon S McElvain, Redondo Beach, CA (US)

(73) Assignee: Xerox Corporation, Norwalk, CT (US)

( * ) Notice: Subject to any disclaimer, the term of this patent is extended or adjusted under 35 U.S.C. 154(b) by 950 days.

(21) Appl. No.: 10/607,668

(22) Filed: Jun. 27, 2003

(65) Prior Publication Data
US 2004/0264786 A1    Dec. 30, 2004

(51) Int. Cl.
*G06K 9/40* (2006.01)
*H04N 1/46* (2006.01)

(52) U.S. Cl. .................. 382/233; 382/245; 382/266; 385/505; 385/506

(58) Field of Classification Search .............. 358/3.27, 358/426.13, 505, 403, 506, 406, 474, 486, 358/487, 496; 382/269, 233, 245, 266
See application file for complete search history.

(56) References Cited

U.S. PATENT DOCUMENTS

| | | | |
|---|---|---|---|
| 4,115,815 A * | 9/1978 | Nakagome et al. .... | 358/426.09 |
| 4,486,784 A * | 12/1984 | Abraham et al. ........... | 382/245 |
| 4,942,541 A * | 7/1990 | Hoel et al. .................. | 358/1.16 |
| 5,644,366 A * | 7/1997 | Ushida et al. .............. | 348/625 |
| 5,687,303 A | 11/1997 | Motamed et al. ........... | 395/117 |
| 5,881,173 A * | 3/1999 | Ohmori ...................... | 382/232 |
| 6,006,013 A | 12/1999 | Rumph et al. .............. | 395/114 |
| 6,167,166 A * | 12/2000 | Loce et al. ................. | 382/266 |
| 6,256,104 B1 | 7/2001 | Rumph et al. ............. | 358/1.15 |
| 6,327,043 B1 | 12/2001 | Rumph et al. ............. | 358/1.15 |

* cited by examiner

Primary Examiner—King Y. Poon
Assistant Examiner—Steven Kau
(74) Attorney, Agent, or Firm—Jeanette Walder

(57) ABSTRACT

A method of improving edge rendering of objects containing run length encoded image pixel data collects two run-length encoded scanlines (upper and lower). Each run transition is inspected for the presence of interesting runs (object tag planes to be grown or shrunk). Depending on the position of the interesting runs relative to the run transition (e.g., in upper or lower scanline, to right or left of boundary), the tag planes of the surrounding runs will be modified. If a tag plane needs to be modified in the fast scan direction, a new run (one or more pixels in length, with the original color) is inserted at the run transition and assigned to the tag plane of the interesting run. If a tag plane needs to be modified in the slow scan direction, the run is subdivided and subsequently assigned to the tag plane of the interesting run.

12 Claims, 4 Drawing Sheets

FIG. 4
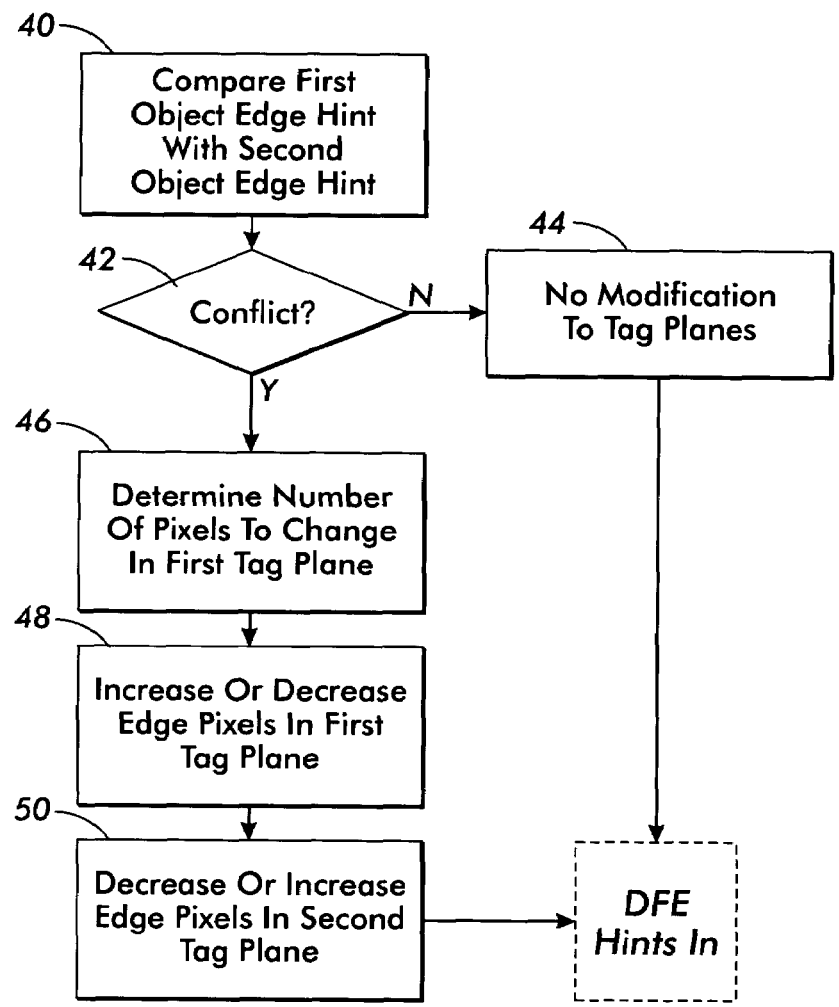
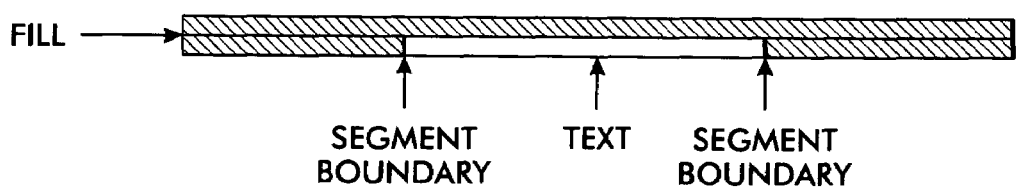
FIG. 5

METHOD FOR TAG PLANE GROWTH AND CONTRACTION USING RUN LENGTH ENCODED DATA

CROSS REFERENCE TO RELATED APPLICATIONS

This invention is related to the inventor's application for "Method for Tag Plane Growth and Contraction for Improving Object Edge Rendering", application Ser. No. 10/608,802, which has been assigned to the assignee of this invention, which has been filed on Jun. 27, 2003, the same date as this application, and which is incorporated herein by reference.

FIELD OF THE INVENTION

This invention relates generally to methods for improving object rendering using tags and hints, and more particularly, to a method for varying the size of an object tag plane using run length encoded data.

BACKGROUND OF THE INVENTION

Run length encoding is a type of lossless compression that utilizes the fact that many files frequently contain the same entity repeated many times in a row. For example, text files use multiple spaces to separate sentences, indent paragraphs, format tables and charts, etc. Digitized signals can also have runs consisting of pixels with the same value, indicating that the signal is not changing over several adjacent pixels. For example, in a data sequence having a long run of zeros, two values are written to the output file to represent that sequence. The first of these is generally the digital value of the sequence of pixels (a zero in this case). The second is the number of zeros, or in other words, the length of the run. If the average run length is longer than two, compression will take place. Many different run length encoding schemes have been developed.

Quite common among digital front ends (DFEs) is the ability to identify object types (text, image, strokes, fill, line art, etc.) embedded in a given page description language (PDL) master. These object types can then be used to optimize the processing of the contone data prior to transmission to the print engine. For some engines, it is possible to supply rendering "hints" or "tags" for each pixel, allowing the engine to optimally render the objects on the page, pixel by pixel. For example, for some printers, the tags are simply halftone screen specifications, and the DFE has complete control over the way each pixel is rendered.

Other engines also have the capability to accept tags or hints to optimize rendering, and these are generally assigned based on the object type. For these engines, a tag or hint tells the rendering engine which rendering conditions to use for a particular object. These tags or hints are generally specified for the entire object. Positive tinted text on white, in the case of some printers, is assigned the "text" hint. For some printing systems, for example the Xerox iGen3, the text hint may instruct the engine rendering module to place high-resolution outline cells at the perimeter of the object (while rendering the body of the text with the default halftone), a method that generally will improve the sharpness of the text. Similarly, negative (white) text on a tinted background may receive the "text" hint, and the background may receive the "fill" hint. For some printers such as iGen3, outlining is explicitly disabled for the "fill" hint. Since all of the pixels that would be converted to outline cells reside on the "fill" portion of the white text/fill boundary, no outlining would therefore be realized for negative text. This presents a serious image quality defect for white text objects on tinted fills, as the edges of this negative text may appear ragged. The problem can also exist at the boundaries of two different object types in which a hint for one object explicitly disables rendering that would be pleasing at the boundary of the other object.

SUMMARY OF THE INVENTION

A method of improving edge rendering of objects, according to one aspect of the invention, includes providing a first object which has a portion of a common edge with a second object; wherein the first object has associated with it a first region of a tag plane for defining rendering hints for rendering the first object; wherein the second object has associated with it a second region of the tag plane for defining rendering hints for rendering the second object; specifying a number of pixels located on the portion of the common edge between the first object and the second object to be modified (modifying may include increasing or decreasing the number of pixels on one of the first object or the second object); and modifying the first region of the tag plane corresponding to the first object by the specified number of pixels at the boundary of the first and second objects. If the first region of the tag plane is increased by the specified number of pixels at the boundary of the first and second objects, the second region of the tag plane is decreased by the specified number of pixels at the boundary of the first and second objects. Correspondingly, if the second region of the tag plane is increased by the specified number of pixels at the boundary of the first and second objects, the first region of the tag plane is decreased by the specified number of pixels at the boundary of the first and second objects.

The method may be applied to white objects on non-white objects. The white object may be of any type, such as a text object, a line art object, etc. The non-white (or tint) object may be of any type, such as a fill object and a stroke object. Both objects may be text objects, for example, such as when a text object is placed over a shadow text object. The method of improving edge rendering of objects, especially white objects on non-white objects, overcomes the problems of the prior art by varying the size of the object in the tag plane in order to improve edge rendering of its corresponding object. The boundary of the contone plane of the two objects remains the same; however, the boundary of the tag plane corresponding to the interface between the two objects is modified in order to better render this interface. Thus in the case of the white object on a tint fill object, by expanding the region of the tag plane associated with the white object, the edge pixels at the negative text/fill interfaces can be rendered in a fashion consistent with positive text on a white background.

The method involves expansion (or contraction) of object tag regions by one or more pixels into the surrounding region, with the surrounding tag regions having a corresponding contraction (or expansion). The objects of interest (e.g., white text) are first identified; the corresponding object tag region is then spread or choked, in a fashion analogous to trapping. This tag plane spread or choke operation can be performed in object space prior to rasterizing, or after the object data are converted to a run-length encoded format, or even in the fully rasterized form. In the case of the negative text on a tint background, by dilating the tag plane for the negative text object, the "text" hint would be forced at least one pixel into the tint object plane everywhere along the perimeter of the negative text. For the Xerox iGen3 system, this would then enable outlining around the perimeter of the text/fill interface, providing greatly improved negative text rendering.

A method of improving edge rendering of objects containing run length encoded image pixel data, according to one aspect of the invention, includes collecting an upper run-length encoded scanline and a lower run-length encoded scanline, wherein each scanline includes a string of first runs of pixels corresponding to a first object, a string of second runs corresponding to a second object and each run is specified by a minimum position in a horizontal direction, a length in pixels and a color; wherein the first object has associated with it a first tag plane for defining rendering hints for rendering the first object; wherein the second object has associated with it a second tag plane for defining rendering hints for rendering the second object; inspecting each run transition, wherein a run transition comprises a point where one object run ends and another object run begins on the scanline, and identifying an interesting run located at the run transition, wherein an interesting run has at least one of a specified tag and specified contone value; for each run transition involving an interesting run, inspecting pixels located in each of the upper and lower scanlines and right and left of the run transition and, based on the position of the inspected pixels relative to one another, determining if the tag planes associated with the surrounding runs should be modified, and specifying a number of pixels to vary the corresponding tag planes; and; and if the tag plane of one of the objects corresponding to the intersecting runs is to be dilated in the horizontal direction, a new run is inserted at the run transition having the specified number of pixels in length and the tag value of the object to be dilated; and the tag plane of the other object is decreased by removing the specified number of pixels in length from the run adjacent to the interesting run.

In many cases, the specified length of the new run is one or more pixels in length. If the tag plane of the object associated with the interesting run needs to be dilated and the tag plane of the object associated with the other run needs to be contracted in the vertical or slow scan direction, the other run is subdivided into two separate runs, and the subdivided portion adjacent to the interesting run is assigned the tag value of the interesting run for every pixel along the interface; this procedure is repeated for a number of times equal to the specified number of pixels for the runs adjacent to the other run in the slow scan direction. If the tag plane of the object associated with the other run needs to be dilated and the tag plane of the object associated with the interesting run needs to be contracted in the vertical or slow scan direction, the interesting run is subdivided into two separate runs, and the subdivided portion adjacent to the other run is assigned the tag value of the other run for every pixel along the interface; this procedure is repeated for a number of times equal to the specified number of pixels for the runs adjacent to the interesting run in the slow scan direction.

The method of improving edge rendering of objects containing run length encoded image pixel data collects two run-length encoded scanlines (upper and lower). Each run transition (or segment boundary) is inspected for the presence of interesting runs (object tag planes to be grown or shrunk). Depending on the position of the interesting runs relative to the segment boundary (e.g., in upper or lower scanline, to right or left of boundary), the tag values of the surrounding runs will be modified. If a tag value needs to be modified in the fast scan direction, a new run (one or more pixels in length, with the original color) is inserted at the segment boundary, and assigned the tag value of the interesting run. If a tag plane needs to be modified in the slow scan direction (e.g., upper run or lower run), the run is subdivided and the part of the subdivided run closest to the interesting run is subsequently assigned the tag value of the interesting run, while preserving its original color. Using this method, tag growth can be efficiently executed with a minimal impact on RIP time.

BRIEF DESCRIPTION OF THE DRAWINGS

FIG. 4 is a flow diagram of a method of improving edge rendering of objects;

FIG. 5 illustrates collecting two scanlines of run-length encoded data;

DETAILED DESCRIPTION OF THE PREFERRED EMBODIMENTS

Figure 1:
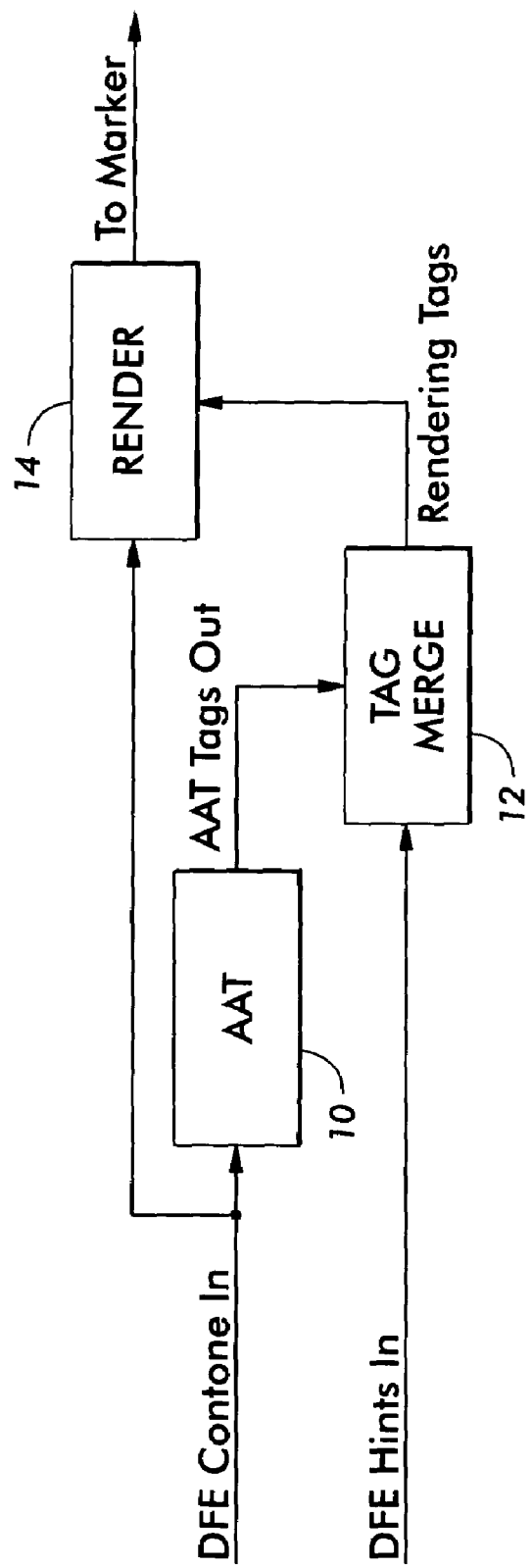
FIG. 1 is a block diagram of a contone rendering module 1.

The term "data" refers generally to physical signals that indicate or include information. An "image", i.e., a pattern of physical light, may include "image objects" in the form of characters, words, and text as well as other features such as line art, graphics, or graphical structures. An image may be divided into "segments," each of which is itself an image. A segment of an image may be of any size up to and including the whole image.

Each location in an image may be called a "pixel." Each pixel has certain pixel values associated with it. Each pixel value is a bit in a "binary form" of an image, or a gray scale value in a "gray-scale form" of an image, or a set of color space coordinates in a "color-coordinate form" of an image. The binary form, gray-scale form, and color-coordinate forms are each a two-dimensional array defining an image. Although described herein as being particularly applicable to continuous-tone processing, the present invention applies equally as well to the processing of color images, wherein each separation is treated, effectively, as a gray-scale or continuous-tone image. Accordingly, references herein to the processing of continuous-tone (contone) or gray-scale images is intended to include the processing of color image separations as well. An operation typically performs "image processing" when it operates on an item of data that relates to part of an image.

The term "tag" or "hint" refers to complimentary data to be used in conjunction with the digital contone data to optimally render each pixel of a digital image. Each pixel of the contone plane is assumed to have a corresponding pixel in the tag plane.

An "image input device" is a device that can receive an image and provide an item of data defining a version of the image. A "scanner" is an image input device that receives an image by a scanning operation, such as by scanning a document. An "image output device" is a device that can receive an item of data defining an image and provide or render the image as output. A "display" is an image output device that provides the output image in human viewable form. "Halftoning" refers generally to rendering the digital image to a bit map form that can be used to drive the imaging device and includes a process that prepares the pixels for driving the imaging devices. For printing devices, the halftone image that is created is usually in a form such binary pixels, high addressability pixels, pulse width modulation codes, or some reduced quantization form that is compatible with the imaging device in the printer.

"Graphical features," "line art objects," and "text" typically refer to computer-generated features in an image as opposed to pictorial or natural scene content. The terms may also be used to describe computer-generated features that have been printed and re-digitized with a device such as an input scanner. The term "dilation" refers to expanding or extending the boundary of a region within a contone plane or a tag plane. The term "contraction" refers reducing or shrinking the boundary of a region within a contone or tag map. Dilation and contraction of the contone or tag plane may be performed independently.

The term "run" refers to representation of a string of contiguous pixels whereby each of the pixels has a common attribute, such as color or tag value. The run is represented by a start position, an end position or length, and the common attribute, such as color or tag value. The term "run length encoding" is a data compression method whereby the digital signals corresponding to an image are represented as a series of contiguous runs.

As described above, many DFEs have the capability to recognize various object types embedded in PDL masters, for example text, stroke, and fills. These object types can then be used to optimize the processing of the contone data prior to transmission to the print engine. For some engines, for example Xerox Corporation's iGen3 and DC2060, it is also possible to supply rendering "hints" or "tags", for each pixel, allowing the engine to optimally render the objects on the page. For the 2060/6060 systems, the tags are simply halftone screen specifications, and the DFE has complete control over the way each pixel is rendered. For the iGen3, there is an intermediate rendering stage, entitled the Contone Rendering Module (CRM).

A simplified block diagram of the CRM is shown in FIG. 1. For each separation, the DFE provides a contone (8 bits/pixel) data plane and hint (4 bits/pixel) data plane. The contone data is passed through the anti-aliased tagging (AAT) module 10. The data is provided to the tag merge module 12. The AAT performs a pixel by pixel inspection of the contone data, and creates a (4 bit) tag based on the particular geometry, object type or edge characteristics detected (it is here that edge tags are created). These AAT tags are then merged with the DFE hints in the tag merge module 12 on a per-pixel basis, producing the final set of CRM rendering tags to be used for the rendering stage 14. By virtue of the tag merge module 12, the DFE specified hints can override any outlining that would otherwise be specified by the AAT module.

Figure 2:
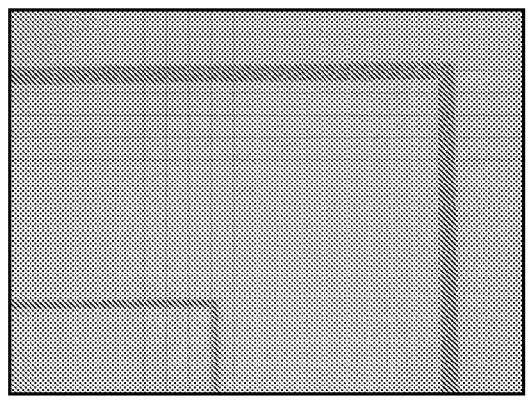
FIG. 2 illustrates outlining around a tinted line art object on a fill object.

For example, for fill objects, outlining is not desirable, and the specification of the DFE "fill" hint will explicitly disable the AAT outline tag; instead the system halftone will be used for rendering. On the other hand, for text and line art objects, the use of outlining has been found to produce superior image quality, so these AAT outline tags are allowed when the DFE "text" hint is specified. An example of such outlining is shown in FIG. 2.

Negative text and line art (or any other negative object) on tinted background (or any other tinted object) presents another problem in the area of rendering. The white objects (e.g., text or line art or other object) will receive the DFE "text" tag, as before, and the background typically will receive the "fill" tag. When the AAT performs its image analysis, it will specify outline cells to be placed at the perimeter of the negative text. However, all of these outline tags will exist inside the fill region, by virtue of the fact that the text is white. Because outlining is explicitly disabled when the "fill" tag is used, the system halftone will be used for rendering these edges, resulting in a ragged text appearance.

The proposed solution to this problem is to "dilate" (or contract) the tag planes associated with negative text or line art. The above-described problem can be solved by one pixel growth of the text tag plane outward (and a corresponding one pixel contraction of the fill tag plane), but it is not limited to this in the general case. In fact, this technique is not limited to negative text/line art; it can be applied to all object types, depending on need. The method may be used whenever two different object types share a portion of a common edge boundary and the rendering hint for the second object type conflicts with the rendering hint for the first object type. The operation is analogous to trapping where the contone data of objects are spread or choked to compensate for misregistration errors. The object tag plane growth would then involve a set of "rules" that are to be followed during image processing. The fundamental rules would then be:

1) Identify objects whose tag plane is to be grown or contracted.

2) Specify the amount (number of pixels) by which the tag plane is to be modified at the edges of these objects.

3) Grow or contract the tag plane of the object of interest by the amount specified and contract or grow the tag plane of the adjacent object by the amount specified.

Figure 3:
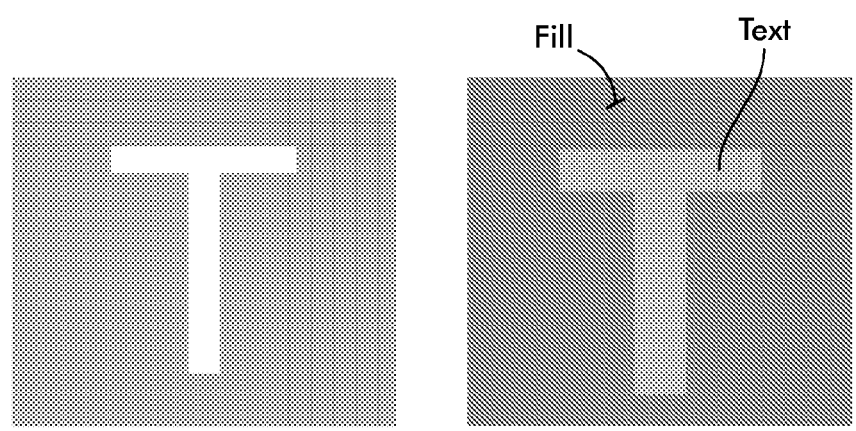
FIG. 3 illustrates contone data for a white text object on a tinted background and its corresponding hint data.

FIG. 3 illustrates the result of tag plane growth for the case of negative text over tint. On the left is the contone representation of negative text on a tint background; on the right are the corresponding tag planes showing the result of tag growth. Note that tag plane for the text hint data has been expanded into the tag plane for the fill data. Correspondingly, the tag plane for the fill data has been contracted. For a printer such as iGen3, this would result in rendering of the negative text edges using the outline AAT cells.

A flow diagram of the method is shown in FIG. 4. Referring to FIG. 4, a first object and a second object have at least a portion of an edge in common. In step 40 the rendering hint to render the edge of the first object is compared with the rendering hint to render the edge of the second object. A conflict is evaluated in step 42. For example, there may be no conflict with the two rendering hints, in which neither tag plane is modified (step 44). In the case of a conflict, in step 46 the number of pixels to be changed at the interface of the two objects in the tag plane is determined. In step 48 the region of the tag plane corresponding to the perimeter of the first object is modified. If the edge pixels are dilated in the tag plane region corresponding to the first object, in step 50 the edge pixels are contracted in the region of the tag plane corresponding to second object, at the interface between the two objects. If the edge pixels are contracted in the region of the tag map corresponding to the first object, the edge pixels are dilated in the region of the tag map corresponding to the second object, at the interface between the two objects. Note that both dilating and contracting of the tag plane can occur at different points along the edge in order to achieve a smooth edge rendering. The method enables all edge pixels to have the desired rendering hint. Note that the foregoing dilation/contraction and corresponding contraction/dilation of the object tag regions is accomplished on a pixel-by-pixel basis to achieve the desired edge condition.

Implementation of such tag plane growth/contraction can be performed in object space (prior to rendering), where page entities are represented by abstract vector descriptors. It can also be performed once rasterization of the tag/contone data occurs, for example in the CRM.

In accordance with another aspect of the invention, a method for tag plane growth and contraction uses the run-length encoded form of raster data. Each scanline of the image consists of a string of "runs", which are specified by a minimum position in the fast (horizontal) direction, a length (number of pixels), a color (if it is constant color), and other tags used for printing purposes. The method collects two run-length encoded scanlines and each run transition is inspected for the presence of "interesting runs". A run transition is the point where any run ends on a particular scanline and is assumed to be an edge (also denoted a "segment boundary"). An "interesting run" in the context of rendering hints and tags is characterized by a specified tag and/or color combination. In the case of negative text, that characterization would specify a contone value of white, and a tag corresponding to a text object. As noted above, in the case of white objects adjacent to non-white objects, for example, a rendering hint which places an outline on the white object will be over-written by the system rendering hint for fill. An interesting run is also a run in which it may be desired to expand or contract the corresponding hint plane in order to achieve a desired rendering output.

The method for tag plane growth and contraction using run length encoded data involves collecting two scanlines of run-length encoded data, as shown in FIG. 5. Referring to FIG. 5, the upper scanline consists of a single run of fill pixels. The lower scanline consists of three runs: a fill run, a text run and a fill run. There are two segment boundaries or run transitions in the lower scanline. These are the points where the fill run meets the text run. The fast- and slow-scan edges, and adjacent corners, the four colors adjacent to the center "crosshairs" at each segment boundary are inspected. The center intersection is formed by the segment boundary in the fast-scan direction between the two segments, and the scanline boundary between the center two scanlines. There are four segments adjacent to these crosshairs, referred to as "upper left", "upper right", "lower left" and "lower right" corners. At each segment boundary, a "geometry" is determined, corresponding to the object type of the four intersecting runs (upper left, upper right, lower left, lower right). For white text/line art which is adjacent to a non-white object, there are a total of 16 posible geometries. Each geometry requires different processing of the surrounding runs. These are listed in Table 1:

TABLE 1

| Geometry | Processing - runs to be modified |
| --- | --- |
| 1) White in Upper Left | Upper right (a), lower left (b), lower right (a) |
| 2) White in Upper Right | Upper left (a), lower left (a) |
| 3) White in Lower Left | Upper left (b), upper right (a) |
| 4) White in Lower Right | Upper left (a) |
| 5) Non-white in upper left | Upper left (b) |
| 6) Non-white in upper right | None |
| 7) Non-white in lower left | Lower left (b) |
| 8) Non-white in lower right | None |
| 9) White in Upper | Lower (b) |
| 10) White in Lower | Upper (b) |
| 11) White on Left | Upper right (a) |
| 12) White on Right | Upper left (a) |
| 13) Diag white upper left | Lower left (b) |
| 14) Diag white lower left | Upper left (b) |

TABLE 1-continued

| Geometry | Processing - runs to be modified |
| --- | --- |
| 15) Solid Non-white | None |
| 16) Solid White | None |

In Table 1, (a) indicates the tag of the run will be modified by only one pixel, and (b) indicates the tag of the entire run will be modified.

Referring to FIG. 5, the first segment boundary or run transition is of type (4)—white in lower right. The second segment boundary is of type (3)—white in lower left. According to table 1, the geometry (4) requires processing the upper left run by modifying it one pixel. According to table 1, geometry (3) the upper left requires modifying the entire run and the upper right is modified by one pixel.

Figure 6A:
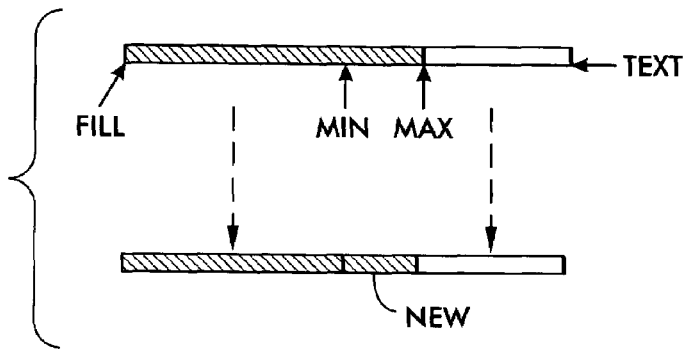
FIGS. 6A-6D illustrate modifications of scanlines.
Figure 6B:
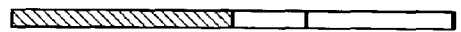
Figure 6C:
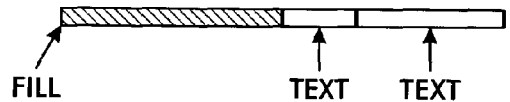
Figure 6D:
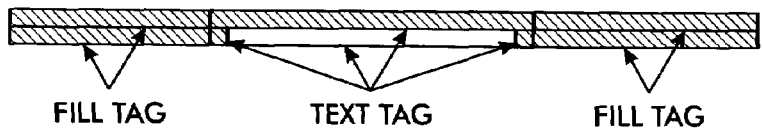

An example of modifying run-length encoded runs is shown in FIG. 6A through 6D. In FIG. 6A, a scanline consisting of a fill run and a text run is shown. A desired range of pixels for the expansion and contraction is specified before any modification begins. Based on the min/max range specified prior to modification, subdivide the existing run, creating a new run as shown in FIG. 6A. Assign the color of the old run to the new run as shown in FIG. 6B. Assign the tag of the white run to the new run as shown in FIG. 6C. The result of this series of operations will, for example, modify FIG. 2 as shown in FIG. 6D. Applying this procedure to the entire object will result in the desired output shown in FIG. 2.

The invention has been described with reference to particular embodiments for convenience only. Modifications and alterations will occur to others upon reading and understanding this specification taken together with the drawings. The embodiments are but examples, and various alternatives, modifications, variations or improvements may be made by those skilled in the art from this teaching which are intended to be encompassed by the following claims.

What is claimed is:

1. A method of improving edge rendering of objects containing run length encoded image pixel data, comprising:

collecting an upper run-length encoded scanline and a lower run-length encoded scanline, wherein each scanline includes a string of first runs of pixels corresponding to a first object, a string of second runs corresponding to a second object and each run is specified by a minimum position in a horizontal direction, a length in pixels and a color;

wherein the first object has associated with it a first tag plane for defining rendering hints for rendering the first object;

wherein the second object has associated with it a second tag plane for defining rendering hints for rendering the second object;

inspecting each run transition, wherein a run transition comprises a point where one object run ends and another object run begins on the scanline, and identifying an interesting run located at the run transition, wherein an interesting run has at least one of a specified tag and specified contone value;

for each run transition involving an interesting run, inspecting pixels located in each of the upper and lower scanlines and right and left of the run transition and, based on the position of the inspected pixels relative to one another, determining if the tag values associated with the surrounding runs should be modified, and specifying a number of pixels to vary the corresponding tag planes; and if the tag plane of one of the objects corresponding to the intersecting runs is to be dilated in the horizontal direction, a new run is inserted at the run transition having the specified number of pixels in length and the tag value of the object to be dilated; and the tag plane of the other object is decreased by removing the specified number of pixels in length from the run adjacent to the interesting run.

2. The method of claim 1, wherein the new run is at least one pixel in length.

3. The method of claim 1, wherein the new run is two pixels in length.

4. The method of claim 1, wherein the new run is three pixels in length.

5. The method of claim 1, wherein if a tag plane needs to be modified in the vertical direction;

if the tag plane of the object associated with the interesting run is to be dilated and the tag plane of the object associated with the other run is to be contracted in the vertical or slow scan direction, the other run is subdivided into two separate runs, and the subdivided portion adjacent to the interesting run is assigned the tag value of the interesting run; and repeating this for a number of times equal to the specified number of pixels for the runs adjacent to the other run in the vertical direction.

6. The method of claim 5 where the number of scanlines modified is equal to at least one.

7. The method of claim 5 where the number of scanlines modified is equal to two.

8. The method of claim 5 where the number of scanlines modified is equal to three.

9. The method of claim 1, wherein the first object comprises a white object and wherein the second object comprises a non-white object.

10. The method of claim 9, wherein the white object is at least one of a text object and a stroke object and the non-white object is at least one of a fill object, an image object and a sweep object.

11. The method of claim 5, wherein the first object comprises a white object and wherein the second object comprises a non-white object.

12. The method of claim 11, wherein the white object is at least one of a text object and a stroke object and the non-white object is at least one of a fill object, an image object and a sweep object.

* * * * *